Feb. 17, 1948.  E. W. BRAGA  2,436,246
AIR COOLED EXPLOSION TURBINE
Filed Oct. 21, 1944
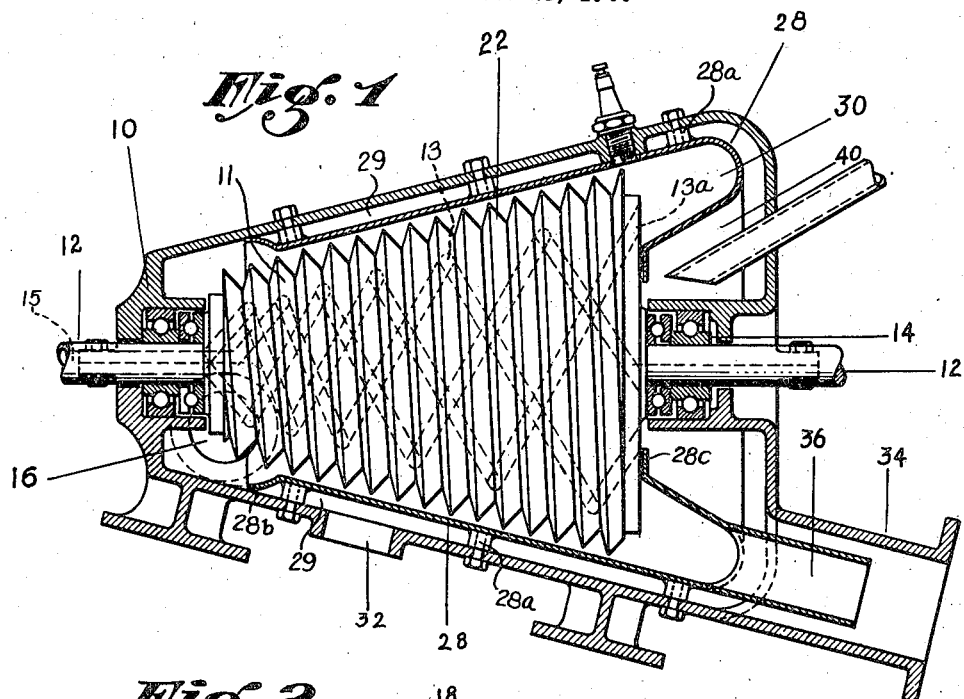
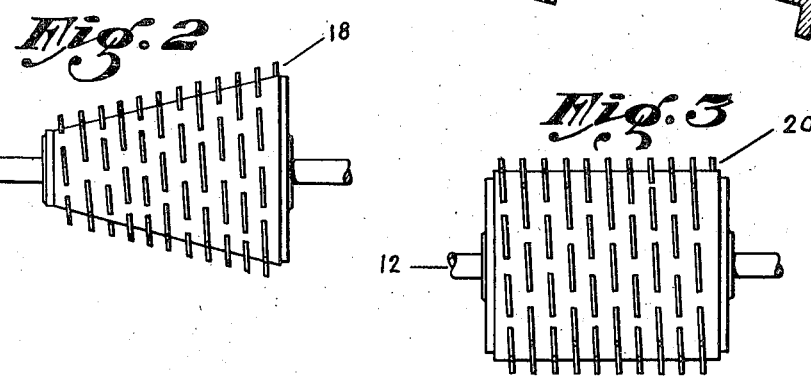
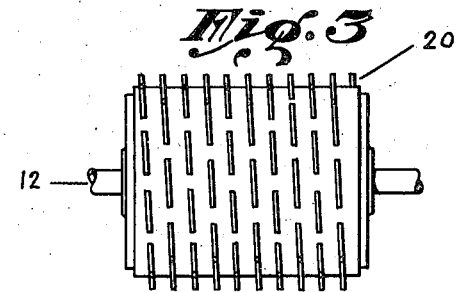
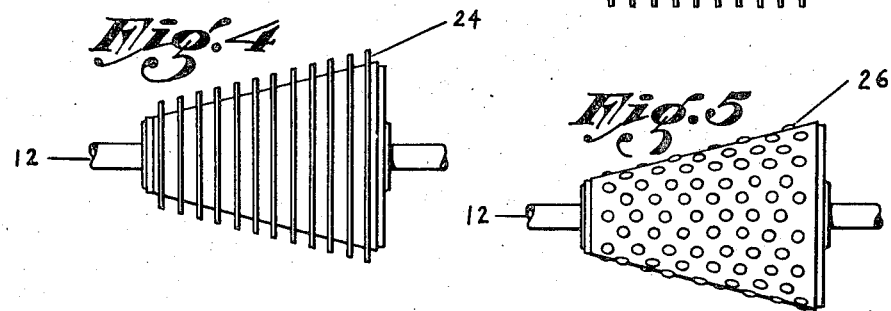
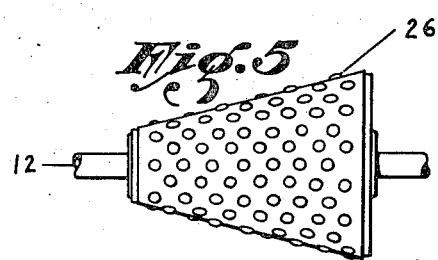
Inventor:
EARL W. BRAGA,
By Munson & File
Attorneys Patented Feb. 17, 1948

2,436,246

UNITED STATES PATENT OFFICE 2,436,246

AIR-COOLED EXPLOSION TURBINE

Earl W. Braga, Los Angeles, Calif.

Application October 21, 1944, Serial No. 559,741

5 Claims. (Cl. 60—41)

1

This invention relates to an air cooled explosion turbine, and the present invention constitutes an improvement upon my original explosion turbine shown and described in U. S. Letters Patent No. 2,289,900, granted to me on July 14, 1942.

One of the principal objects of this invention is to provide new and distinct means for the cooling of an explosion turbine, such as described in my patent hereinabove referred to, and wherein the combustion takes place either wholly or partially within the rotor.

The cooling elements of this present invention may likewise be applied to explosion turbines of other designs, and ordinarily with slight changes to practically any turbine of this type, commonly known as a "gas" turbine.

In explosion turbines of the class described, and particularly those used in aircraft, strict economy of space and weight is obviously necessary, and it is part of my invention to provide a cooling system for the rotor of an explosion turbine of this nature which will permit of an innerwing installation aboard aircraft, which will reduce air resistance and which will also save material and weight, thereby affording compactness. These same advantages would also apply to automobiles, marine installations and other utilizations of these turbines, whereby engineering thereof as a whole would be simplified.

It is paramount that cooling of such turbine and protection of adjacent structure from heat be given extreme consideration.

Other and further important objects of the invention will be apparent from the disclosures in the accompanying drawings and following specification.

The invention, in a preferred form, is shown in the drawings and hereinafter more fully described.

In the drawings:

Figure 1 is a side elevation of the improved air cooled explosion turbine of this invention, parts being broken away and parts being shown in section, and also illustrating certain modifications of the invention.

Figure 2 is a somewhat simplified view of the rotor of an explosion turbine of this invention, showing the same with a different type of cooling flange applied thereto.

Figure 3 shows a slightly different type of rotor with cooling flanges somewhat similar to those of Figure 2 installed thereon.

Figure 4 illustrates a rotor similar to that shown in Figure 2, but with a modified form of cooling flange or fin.

Figure 5 shows a still further modification of the invention.

As shown in the drawings:

The reference numeral 10 indicates generally the housing or casing of the air cooled explosion turbine of my invention, having a shaft 12 extending therethrough, which shaft is mounted in bearings 14. A rotor 11 is secured upon the shaft 12 within the housing 10, said rotor being illustrated in Fig. 1 as substantially similar to the rotor of my Patent No. 2,289,900, except that I now prefer to make it frustoconical, for reasons to be set forth presently. Within the rotor are combustion passages 13, preferably three in number, said combustion passages being formed as tubes or conduits of constant diameter from end to end and arranged as helices of continuously increasing radius. At their intake ends (the left hand end in Fig. 1), said combustion tubes 13 communicate with an intake passage 15 formed axially in the shaft 12, and at their exhaust ends 13a they are open to the space within the housing 10. As described in my said Patent No. 2,289,900, combustible fuel is forced into said tubes 13 under pressure from an outside source, not shown, and is burned therein. The expansion due to combustion is translated into increased velocity, the reaction therefrom providing the force for turning the rotor.

An opening for cooling air is provided at 16 and the air is actually circulated and propelled over the rotor by means of the cooling flanges or fins now to be described.

Primarily the cooling flanges are preferably spirally constructed, as illustrated at 22 in Figure 1 and at 18 in Figure 2 and at 20 in Figure 3, and in addition to operating to radiate heat, which is well known in the art, these flanges, being applied to the rotor in a spiral or screw fashion and extending over the rotor, will in rotation perform a screw action and tend to draw comparatively cool air into the turbine housing 10 through openings provided therefor, such as for example the opening 16. An external blower or air scoops may be provided to assist in the air circulation, but the spiral action ordinarily suffices.

The spiral screw action of the spiral flanges or prominences 18, 20 and 22 will circulate the air over the rotor, whereupon it finally flows out of the housing through an outlet structure, or the same may, as disclosed in Figure 1, join the combustion exhaust.

More than one spiral flange or prominence may be begun and terminated on the same rotor and the same may be continuous or non-continuous, the non-continuous type being shown in Figures 2 and 3.

Figure 4 illustrates the flanges 24 as extending simply circumferentially of the rotor and without any spiral action. This has been found useful in some adaptations.

These raised metal prominences, either helical or non-continuous as desired, on the periphery of the rotor, may be reduced to points or hobs, such as shown at 26 in Figure 5, this being a further modification of the discs 24 in Figure 4. Ribs, threads, ridges, teeth, points, fins, blades, vanes, hobs, dapplings and modifications thereof, whether completely circumferential, longitudinal or partially of either design may be employed.

These metal prominences or fins may also be plane, flat, waved, fluted, solid, embossed, perforated, drilled, punched, undulating, sphered, irregular, or in various modifications and combinations, and also may be in or upon the rotor's peripheral surface.

The utilization of various types of fins or the like, as above described, will serve to draw cooling air over, about and around the rotor, especially while the same is in action, and the cooling action, both on account of the spiral construction of the fins themselves and the conical shape of the rotor, will be in ratio of temperature to circumference. Furthermore, the periphery at the hotter portion of the rotor travels circumferentially faster, whereby greater cooling action results at the most desired point.

Greater centrifugal action is therefore attained at the points where the heat is greatest, having a tendency to dispose of the heat faster and also providing more capacity to handle this increased heat. Also as the spiral progresses, its diameter increases, thereby also increasing the capacity for handling the cooling air and the increasing rotor heat.

The cooling air, on account of the spiral nature of the fins or other elements, is guided directionally over the rotor, preventing any reuse and assuring its quick and positive discharge from the hot rotor, and as illustrated in Figure 1, preferentially this discharge is centrifugally into the combustion exhaust.

An inner shell or baffle 28 is spaced from and secured to the housing 10 by screws and spacing lugs 28a, and forms therewith an air space or jacket 29. The baffle 28 closely surrounds the cooling fins 22 of the rotor, and conforms to the shape of said rotor, whether conical, as in Fig. 1, or cylindrical as in Fig. 3. At its forward (left hand) end, the baffle is expanded into tight contact with the housing, as shown at 28b, and at its rear end it is extended beyond the end of the rotor and then turned inwardly into close proximity thereto, as at 28c, forming an exhaust carry-off ring 30 into which the burned gases from the combustion tubes 13 are discharged, and by which they are collected and directed to an exhaust nozzle 36 positioned within the cooling air exhaust pipe 34. The combustion exhaust is thereby mixed with and cooled by the discharged cooling air, and the velocity of said combustion exhaust issuing from the nozzle 36 serves to increase the velocity of said air and therefore assists the fins 22 in propelling the cooling air through the housing.

The cooling air flowing over the rotor is kept in proximity to the rotor by such baffling 28, the cooling air simultaneously maintaining cooling contact with such baffling. As the cooling air is discharged off the rotor, it is thrown against and over the continuation of this baffling 28, thus affording cooling to the exhaust travel area, maintaining same at a safe temperature which further safeguards adjacent structures.

The cooling air, no matter how warm when discharged from the rotor, is obviously cooler than the exhaust gases, whereby those exhaust gases are pre-cooled prior to release and correspondingly decreasing their volume, whereby a quieter exhaust results.

Adding the flow of cooling air from the rotor to the combustion exhaust further assists in scavenging such combustion exhaust from the turbine.

The use of this invention wherein is used a frusto-conical shape rotor, allows of higher rotor speeds before the materials themselves reach a point of disintegration under centrifugal force, which safety limit ordinarily would restrict the device to a lower number of revolutions per minute, and which would also be the case if a flange of greater initial peripheral diameter were employed.

The conical shape of the rotor herein preferred will allow the grooves and ridges or prominences of said rotor to be positioned more closely to the combustion tubes 13. In this way, excessive flange height or weight on a portion of the rotor is considerably eliminated. It is apparent same would likewise hold true on a rotor having combustion chambers other than tubes.

By permitting a conical or similarly shaped rotor, the original rotor mass and consequent inertia would be decreased, allowing quicker starting, faster acceleration and more adequate throttle response and sensitivity, thereby resulting in more delivered horsepower at the shaft with better control.

The fact that the cooling air is guided about the rotor itself eliminates air resistance to the rotation of the rotor in the spiral arrangement of the fins, which form produces a tendency for a boring action into the cooling air, with a correspondingly lesser amount of friction and other resistance.

It will be evident that herein is provided a novel cooling arrangement for explosion turbines of the class described wherein the well-known fin cooling action is combined in a single structure with means for actually forcing the cooling air over the rotor and about and into those places where prompt and efficient cooling action is most desirable.

It is of prima facie converse suggestion that one may direct combustion against the convolutions of a spirally or helically grooved or constructed rotor, whether the rotor be solid or otherwise, in order to secure reactional turning of the rotor and in such case, by circulating air through spiral or helical tubes, or chambers or louvres within the rotor to escape openings in the rotor, and whether same departs from the housing merely as hot air or joins with the exhaust combustion gases in passing from the housing would, aside from being an ipso facto transposition of my said U. S. Patent No. 2,289,900, allow only modified cooling in comparison with my present invention.

Forcing cooling air through an aperture in the housing and conducting such cooling air after heating through an aperture in the housing, is anticipated by the art and purview of my invention of U. S. Patent No. 2,289,900.

On the other hand, it is definitely obvious that greater art and invention, as well as simplicity, facility, economy and practical engineering attach to my invention herein described, in that it recognizes the natural law of peripheral radiation of heat and complies with such natural law by exteriorly bathing the rotor's peripheral surface and prominences with cooling air in dissipation of the excess combustion heat from within.

Provisions of my aforesaid earlier U. S. Patent

No. 2,289,900 allow apertures in the housing for admission of cool air and exhausting of hot air. This present invention on improvements to explosion turbines covering cooling, provides for use of additional apertures in the housing, such as 32, for instance, to bring cool air within the housing, into the space between the said baffling 28 and the housing 10, thus cooling the baffling 28 on its outer surfaces. The housing 10 confines such cooling air so introduced, so that it will further flow over and around the combustion exhaust ring or pipes and same is exhausted from within the housing through an aperture 34, preferably surrounding the combustion exhaust tube 36. This guidance of the air further cools and quiets the combustion exhaust and assists in protecting nearby structures, such as a plane wing or automobile adjacencies.

Figure 1 further shows other apertures, such as 38, furnishing cooling air to the bearing structures, exhaust baffling 40, and to the combustion exhaust ducts and contiguous structure at that end of the turbine. Such cooling air may be from air scoops or blower, and is carried off in the hot air duct 34 surrounding the hot combustion exhaust tube 36.

Where adjacent structure or absence thereof permits, the exhaust tube 36 may be terminated, the combustion exhaust then joining the hot air in duct 34 prior to release to atmosphere. This creates a drawing effect on the hot air, causing an induction of cooling air into the housing and its flow to such point. The combustion exhaust as it leaves the rotor and enters the exhaust manifolding likewise will cause an obvious induction of cooling air into the housing and over the rotor into the exhaust.

I am aware that many changes may be made and numerous details of construction varied throughout a wide range without departing from the principles of this invention, and I, therefore, do not propose limiting the patent granted hereon otherwise than as necessitated by the appended claims.

I claim as my invention:

1. In an explosion turbine, a frusto-conical rotor having an interior combustion passage extending from the smaller to the larger end in curved lines receding continuously from the rotor axis, cooling fins projecting from the peripheral surface of said rotor, a frusto-conical housing surrounding said rotor in close proximity to said cooling fins, and means for propelling a stream of cooling air through the space between said rotor and said housing.

2. In an explosion turbine, a frusto-conical rotor having an interior combustion passage extending from the smaller to the larger end in curved lines receding continuously from the rotor axis, cooling fins projecting from the peripheral surface of said rotor, a housing surrounding said rotor, said housing having spaced inner and outer walls, the inner wall being in close proximity to said cooling fins throughout the length of the rotor, means for propelling a stream of air through the space between said inner wall and the rotor, and means for propelling another stream of air through the space between said inner and outer walls.

3. In an explosion turbine, a frusto-conical rotor having an interior combustion passage extending from the smaller to the larger end, the path of said passage forming a helix of continuously expanding radius, a helical cooling fin projecting from the peripheral surface of said rotor, a stationary housing surrounding said rotor in close proximity to said cooling fins, said housing having an air intake in the region of one end and an air outlet in the region of the other end, and said fin being directionally arranged to propel a stream of cooling air from said intake toward said aperture.

4. In an explosion turbine, a rotor having an interior combustion passage with a discharge aperture at the rear end of said rotor, a housing surrounding said rotor, said housing having an air intake in the region of its forward end and an air outlet in the region of its rear end, a baffle within said housing and spaced therefrom to form therewith a cooling jacket surrounding said rotor, the rear end of said baffle extending beyond the rear end of said rotor and being curved inwardly and forwardly into close proximity to said rear end of the rotor to form an exhaust carry-off ring, and an exhaust nozzle leading from said ring and extending into said air outlet of the housing, whereby the exhaust gases issuing from said nozzle will induce a stream of cooling air to flow through said housing.

5. In an explosion turbine, a rotor having an interior combustion passage with a discharge aperture at the rear end of said rotor, cooling fins projecting from the peripheral surface of said rotor, a baffle surrounding said rotor in close proximity to said cooling fins, the rear end of said baffle being extended beyond the rear end of said rotor and being curved inwardly and forwardly into close proximity to said rear end of the rotor to form a carry-off ring for the exhaust gases issuing from said discharge aperture, means for propelling a stream of cooling air around said rotor and within said baffle, said air mingling with the exhaust gases in said carry-off ring, a housing surrounding said baffle within which said baffle is secured in spaced relation to form a cooling jacket, said housing having means for admitting air into said jacket and into the space within said baffle, and said housing having an air outlet at its rear end, and an exhaust nozzle leading from said carry-off ring and extended into said air outlet in radially spaced relation thereto, whereby the mingled air and exhaust gases issuing through said nozzle will induce a flow of cooling air through said jacket.

EARL W. BRAGA.

REFERENCES CITED

The following references are of record in the file of this patent:

UNITED STATES PATENTS

| Number | Name | Date |
|---|---|---|
| 1,858,322 | Cooper | May 17, 1932 |
| 1,960,810 | Gordon | May 29, 1934 |
| 2,019,879 | Wahlstrom | Nov. 5, 1935 |
| 2,112,391 | Anxionnaz | Mar. 29, 1938 |
| 2,154,481 | Vorkauf | Apr. 18, 1939 |
| 2,234,767 | Larrecq | June 28, 1939 |
| 2,289,900 | Braga | July 14, 1942 |
| 2,370,192 | Reeves | Feb. 27, 1945 |